Nov. 12, 1940.　　　　　F. ULRICH　　　　　2,221,740
MANUFACTURE OF SLIDE FASTENER ELEMENTS
Filed Dec. 11, 1937　　　2 Sheets-Sheet 1
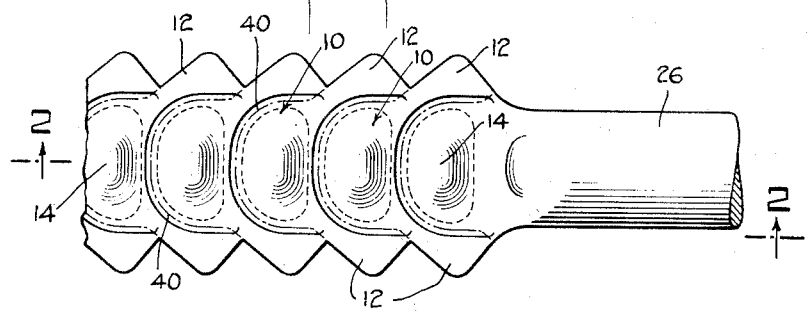
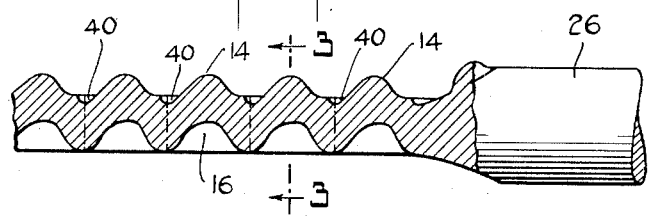
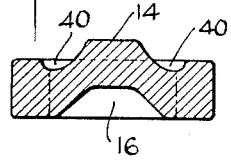
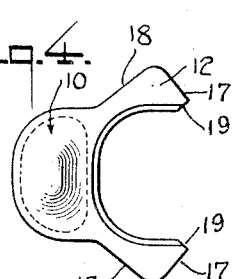
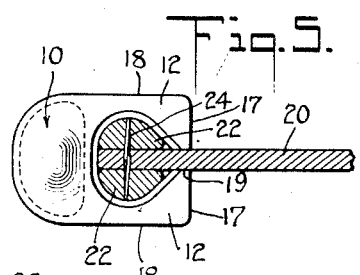
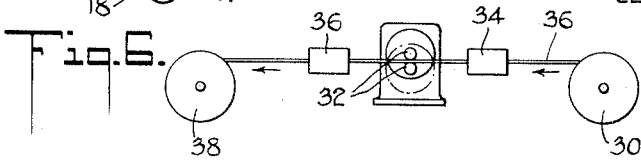
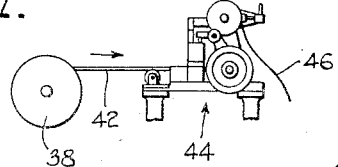
INVENTOR
Frederick Ulrich
BY
James & Franklin
ATTORNEYS Nov. 12, 1940.    F. ULRICH    2,221,740
MANUFACTURE OF SLIDE FASTENER ELEMENTS
Filed Dec. 11, 1937    2 Sheets-Sheet 2

INVENTOR
Frederick Ulrich
BY
James & Franklin
ATTORNEYS

Patented Nov. 12, 1940

2,221,740

UNITED STATES PATENT OFFICE 2,221,740

MANUFACTURE OF SLIDE FASTENER ELEMENTS

Frederick Ulrich, Bayonne, N. J., assignor to Conmar Products Corporation, Bayonne, N. J., a corporation of New Jersey Application December 11, 1937, Serial No. 179,299

23 Claims. (Cl. 29—148)

This invention relates to slide fasteners, and more particularly to the manufacture of the interlocking elements thereof.

The ordinary methods of manufacturing standard slide fastener elements involve a certain amount of scrap or waste material due to the irregular configuration of the elements when in open-jawed condition. This scrap or waste, while apparently small and negligible when dealing with a few elements, becomes very important when the slide fasteners are manufactured in vast amounts under high speed quantity production methods.

The primary object of my invention is to generally improve the manufacture of standard slide fastener elements, particularly with a view to increasing the efficiency and economy of manufacture. By standard elements I mean the most common type in which the jaws have substantially parallel outer edges, with substantially square ends for cooperation with the flanges of the slider. A more specific object is to manufacture such standard slide fastener elements without scrap or waste while making and handling the same in a connected series or continuous wire of embryo elements. A still more particularized object is to make the invention applicable to raw stock of the most conventional and inexpensive character, as for example, a simple round wire of uniform diameter, or a simple flat sheet of uniform thickness. Still another object of my invention is to apply the improvement features thereof to the process disclosed and claimed in a co-pending application Serial No. 215,180 filed by George Wintritz on June 22, 1938, which process is a most efficient, advantageous and desirable one, despite the single disadvantage that it does involve the production of some scrap or waste between the elements, and that disadvantage is eliminated in accordance with the present invention.

To the accomplishment of the foregoing and other more detailed objects which will hereinafter appear, my invention consists in the method steps and the product produced thereby, and their relation one to the other, as hereinafter are more particularly described in the specification and sought to be defined in the claims. The specification is accompanied by drawings in which:

Fig. 1 is a plan view of a short section of wire showing the manner in which a round wire is formed into a connected series of embryo slide fastener elements;

Fig. 2 is a section taken in elevation in the plane of the line 2—2 of Fig. 1;

Fig. 3 is a transverse section taken in the plane of the line 3—3 of Fig. 2;

Fig. 4 is a plan view of a single finished element made in accordance with my invention;

Fig. 5 is a similar view showing the element clamped to a tape or stringer;

Figure 8:
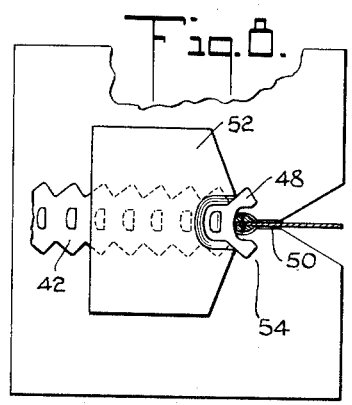
Figure 9:
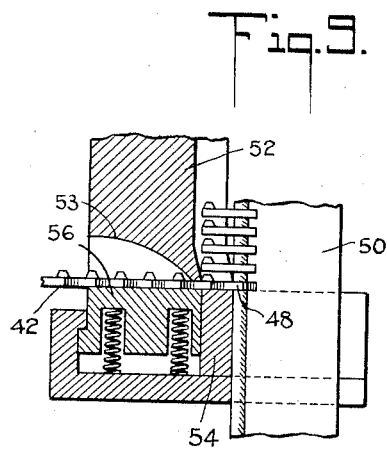
Figure 10:
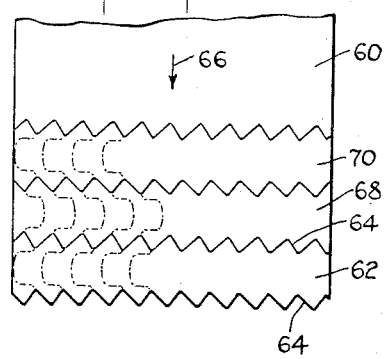
Figure 11:
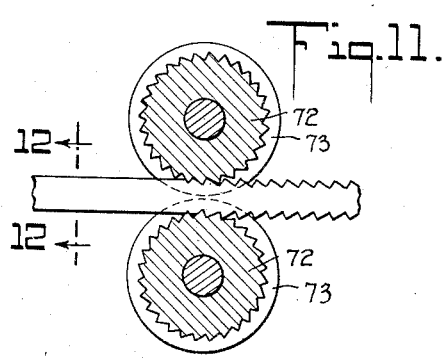
Figure 12:
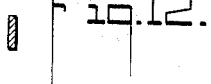
Figure 13:
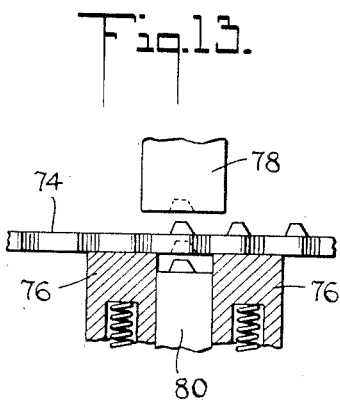
Figure 14:
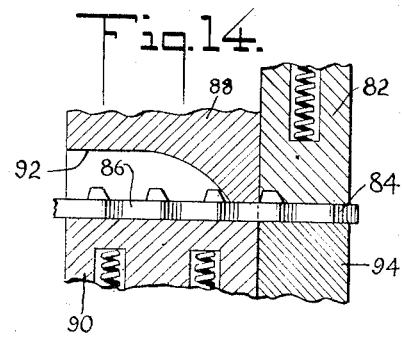

Fig. 6 schematically illustrates the production of the wire by a rolling process;

Fig. 7 schematically illustrates the utilization of the rolled wire for application of the elements to a tape or stringer as the elements are severed from the wire;

Fig. 8 is a plan view schematically illustrating the punch arrangement for separating the endmost element from the wire;

Fig. 9 illustrates the same in side elevation;

Fig. 10 is a plan view showing the manner in which strips of embryo slide fastener elements may be severed from a sheet of material without scrap or waste;

Fig. 11 illustrates an alternative method for forming the desired strip by rolling the same, the edges of a flat wire being rolled to the desired notched or serrated condition;

Fig. 12 is a section through the wire taken on the plane of the line 12—12 of Fig. 11;

Fig. 13 schematically illustrates the formation of the desired interlocking means or projection and recess on the heads of the elements when working in accordance with the processes of Fig. 10 or Fig. 11; and Fig. 14 schematically illustrates the severance of the finished elements from the strip.

Referring to the drawings, and more particularly to Figs. 1 and 2, I there show a step product obtained when practicing the invention in preferred manner. This step product is an integral strip of embryo fastener elements each having embryo spread jaws 12 and an embryo head generally designated 10. The embryo head is provided with interlocking means, and in the present case, the interlocking means is of conventional type, there being a projection 14 on one side of the embryo head and a recess 16 on the opposite side of the embryo head. It will be noticed on inspection of the drawings that the embryo head of each embryo element is located within and generally conforms to the embryo jaws of the next embryo element, the embryo head 10 substantially filling the space between the spread embryo jaws 12. From another and perhaps more accurate viewpoint, it may be said that the embryo jaws 12 are so widely spaced and spread and so shaped, as to form a space therebetween large enough to receive the embryo head 10.

The shape of the exterior of the jaws also deserves consideration. In Fig. 4 I show the individual element as severed from the continuous strip of embryo elements. This element is applied to a tape as shown in Fig. 5, and it will be noted that when the jaws 12 are changed from the spread position of Fig. 4 to the closed position of Fig. 5, the outer edges 18 change from sharply divergent position to parallel position and preferably are spaced apart an amount substantially equal to the width of the head 10. The ends 17 of the jaws are preferably disposed substantially perpendicular to the outer edges 18 so that when the jaws are closed the ends form a surface which is substantially perpendicular to the tape, as is shown in Fig. 5. The ends are of such dimension that when closed against the tape the sides of the jaws are brought into substantially parallel relation while the ends form substantially perpendicular shoulders for best cooperation with the flanges of a slider. In other words, the element when completed and fastened to the tape does not differ noticeably in appearance from elements made by the more conventional wasteful methods, except perhaps for the shape of the opening between the jaws which receives the beaded edge of the tape. In respect to the inside of the jaws, attention may be directed to the short inner walls 19 which preferably extend generally parallel to the outer walls 18 and generally perpendicular to the end walls 17. With such an arrangement, the inside walls 19 bear directly against the tape when the jaws are closed, as shown in Fig. 5, thus providing a substantial bearing surface to prevent penetration of the tape. The tape may be constructed in accordance with known methods, that here illustrated comprising a woven tape 20 having cords 22 sewed on opposite sides of one edge of the tape as by means of stitching 24.

The desired shaping of the jaws 12 causes the wire or strip of embryo elements to have notched or serrated edges, as is clearly evident from inspection of Fig. 1. As will be developed later, this edge formation may be obtained in a number of ways, but I prefer to obtain the same by pressing and deforming simple round wire stock as illustrated at 26 in Figs. 1 and 2. The deformation of the wire to change it from round to the desired form is preferably done by a rolling process disclosed and claimed in the aforesaid co-pending application Serial Number 215,180 filed by George Wintritz on June 22, 1938. The arrangement is schematically illustrated in Fig. 6, in which the round wire stock 36 is fed from a large supply reel 30 to small diameter pressure rolls 32. Wire straightening and guiding devices are schematically represented at 34 and 36. The rolled wire is wound up on a take-up reel 38. The pressure rolls 32 are matingly recessed and so shaped that in a single rolling operation, the round wire is changed to form the desired projections 14, recesses 16 and jaws 12. The wire is given the desired serrated or notched edge. The embryo heads 10 of the embryo elements may, if desired, be outlined by a trough-like depression or groove 40 (see Figs. 1, 2 and 3), but this is not essential. The object of this groove is to help properly finish the shaping of the heads of the elements to desired configuration, and also to facilitate severing of the elements. The lines of severance are indicated in Figs. 1, 2 and 3 by dot-and-dash lines, and it will be noted that the trough 40 is preferably horizontal at the point of severance, this being a desirable condition for best cooperation with the punch subsequently functioning to sever the individual elements from the wire.

In the drawings it will be seen that the successive notches or serrations at the side edges of the wire are closely adjacent one another, and that the successive interlocking means or projections and recesses are closely adjacent one another, the spacing therebetween being only a fraction of the length of the elements.

As is explained in the co-pending application Serial Number 215,180 previously referred to, the embryo elements are preferably fed jaw first toward the tape, and are severed from the wire at or about the same time that they are secured to the tape. For this reason, the wire is rolled in such direction as to point the embryo elements head first, as is clearly shown in Figs. 1, 2 and 6. It necessarily follows that when the wire is drawn from reel 38, the embryo elements point jaw first. The apparatus for mounting the elements on the tape forms no part of the present invention, and need not be described in detail. It is schematically illustrated in Fig. 7, in which the wire 42 is fed jaw first from reel 38 to a mounting machine generally designated 44 wherein the elements are successively secured to an intermittently vertically moving tape, the finished tape carrying the fastener elements being indicated as leaving the machine at 46.

The machine is described in application Serial Number 215,180 previously referred to, but one change may be indicated. As described in said application, there is a web of waste or scrap material between the embryo elements, and the severing punch punches this material away from between the elements. No relative vertical displacement of the wire and element is needed. In the present arrangement, there is no waste or scrap material between the successive embryo elements, the severing operation being a shearing operation, and I therefore provide relative movement of the wire and the endmost element being severed therefrom. For convenience in attaching the endmost element to the tape, I prefer to move the wire rather than the element. Referring to Figs. 8 and 9, the endmost element 48 is shown adjacent the tape 50, said element being severed from the wire by a punch 52 which operates on the wire and cuts around the element. The element 48 rests upon and is held in position by a stationary support 54 whereas the wire 42 is depressed by punch 52, the movement of wire 42 being accommodated by a yieldable support or "spring pad" 56. The punch 52 is cut away at 53 for clearance. The clamping jaws are not shown, but are generally like those in application Serial No. 215,180 above referred to. They follow the punch 52 on each side of tape 50, and operate directly over the die 54 on which the endmost element rests.

I have so far described the invention in preferred form in accordance with which the embryo elements are rolled from a round wire. It is also possible, however, to utilize the main features of the invention while starting with other types of stock. For example, in Fig. 10 I show the manner in which strips of embryo elements may be formed from a large sheet 60. Strips 62 having the desired serrated or notched edges 64 are struck successively from the edge of the sheet by a suitable die working in a large press. The sheet 60 is, of course, intermittently advanced in the direction of the arrow 66.

It is important to observe that the successive strips 62, 68, 70, may themselves be struck from the sheet without scrap or waste metal, for the serrated edges of the successive strips mate with one another. If the notches or points of the successive strips are made symmetrical, the strips may be considered to face all in the same direction, but this is not at all necessary, and the notches may be made unsymmetrical in order to give the spread embryo jaws the most desirable outline. The only difference in such case is that alternate strips may be considered as facing in opposite directions. Thus, in strips 62 and 70 the embryo heads point toward the left, while in strip 68 the embryo heads point toward the right.

This result may be obtained while using a single punch or die having the outline of the strip 68, the sheet 60 then being advanced the distance of two strips for each operation of the press. Strip 68 is then formed directly beneath the punch and strip 62 is formed beyond the punch, two strips being cut for each operation of the punch.

Still another manner in which strips having the desired serrated edge may be formed, is illustrated in Fig. 11. In this case I begin with a wire of preferably rectangular cross-section, as shown in Fig. 12. The wire is run between pressure rolls 72 which function to indent or serrate the edges of the strip. The rolls have flanges 73 at each side to prevent spreading of the material sideways while the edges are being compressed by the rolls. A continuous strip of great length may be formed, the strip being reeled, if desired.

The strips of Figs. 10 and 11 may be provided with the desired projections and recesses, and may be severed into individual elements, in accordance with known methods unnecessary to outline here in detail. The formation of the head and recess is schematically illustrated in Fig. 13, in which the strip 74 is fed over spring pads 76. A press-operated punch 78 moves the strip 74 downwardly against the cooperating stationary die 80. The strip is, of course, intermittently fed longitudinally between successive operations of the punch 78. This feed is facilitated by the notching or serration of the strip which provides excellent surfaces against which the appropriate feed and positioning dogs may operate.

The severance of the wire into individual elements is schematically illustrated in Fig. 14, in which it will be seen that a punch 88 cuts the strip 86 free from the endmost element 84. The punch works against a spring pad 90, and is cut away for clearance at 92. The shearing action is against stationary die 94. The end element 84 is held by a spring pressed plunger 82 which reciprocates with the punch 88, in known fashion. It is a simple matter to sever the elements from the strip when dealing with loose elements which are to be subsequently tumbled, hoppered, and so on. If the elements are to be secured directly to the tape as they are severed from the strip, the separation may be performed as was explained in connection with Figs. 8 and 9.

It will be understood by those skilled in the art that the operations of Figs. 13 and 14 need not be performed in separate machines, and in fact, the punches 78 and 88 may be mounted directly on a single press for simultaneous movement.

It will also be understood that it is not necessary within the scope of the present invention to form the heads after forming the serrated strips. It is possible for example, when cutting strips from a sheet as shown in Fig. 10, to form the heads and recesses in the sheet as the sheet is fed through the press, so that the strips cut from the sheet are characterized not only by the serrated edges, but also by heads and recesses. In such case the only operation needed to complete the elements is to sever the strip into individual elements, this being done all without scrap or waste, as has been previously described.

It is believed that the invention as well as the many advantages thereof, will be fully understood from the foregoing description. The elements are formed without substantial scrap or waste material, while starting with raw stock in common, inexpensive form, and while forming the embryo elements in a continuous strip or wire.

It will be apparent that while I have shown and described my invention in preferred forms, many changes and modifications may be made without departing from the spirit of the invention defined in the following claims.

I claim:

1. A step product used in the manufacture of slide fastener elements, said step product comprising a single integral strip of embryo fastener elements each having embryo spread jaws, the head of one element being located between the embryo spread jaws of the next element, said head filling the space between said embryo spread jaws, the exterior edges of the strip being notched or serrated to conform to the outer ends of the embryo spread jaws, whereby the elements may be formed from the strip without substantial waste or scrap material.

2. A step product used in the manufacture of slide fastener elements, said step product comprising a flattened strip of metal having closely spaced interlocking means at the top and bottom, the exterior edges of the strip having closely spaced notches or serrations to conform to the outer ends of embryo spread jaws, said spacing being only a fraction of the length of the elements, the strip providing metal for a series of embryo fastener elements with the embryo head of one embryo element nested within and filling the space between the embryo spread jaws of the next embryo element, whereby the elements may be formed from the strip without substantial waste or scrap material.

3. An interlockable element for a slide fastener, said element comprising a head and spread jaws connected thereto, the configuration of said head when viewed in plan being such as to conform to and fit fully within the space between the jaws, said jaws having diverging outer sides adapted to be brought into substantially parallel relation when the jaws are closed.

4. An interlockable element for a slide fastener, said element comprising a head and spread jaws connected thereto, said head being formed on opposite sides with a projection and a recess, the configuration of said head when viewed in plan being such as to conform to and fit fully within the space between the jaws, said jaws having diverging outer sides adapted to be brought into substantially parallel relation when the jaws are closed, and having converging ends which are substantially perpendicular to the sides.

5. An interlockable element for a slide fastener, said element comprising a head and spread jaws connected thereto, said head being formed with interlocking means, and said jaws being so widely spaced and spread and so shaped as to form a space therebetween large enough and so shaped that the material removed from between said jaws will itself constitute a head like the head of the element, said jaws having ends converging at such an angle that when the jaws are closed on a tape the ends come substantially perpendicular to the tape, the part just inside the ends being substantially perpendicular to the ends in order to form a broad bearing surface on the tape when the jaws are closed.

6. An interlockable element for a slide fastener, said element comprising a head and spread jaws connected thereto, said jaws being so widely spaced and spread and so shaped as to form a space therebetween large enough to receive the entire head of an identical element, said jaws being so shaped that when closed the outer edges come into substantially parallel relationship.

7. An interlockable element for a slide fastener, said element comprising a head and spread jaws connected thereto, said head being formed with interlocking means, and said jaws being so widely spaced and spread and so shaped as to form a space therebetween large enough and so shaped that the material removed from between said jaws will itself constitute a head like the head of the element, said jaws having ends converging at such an angle that when the jaws are closed on a tape the ends come substantially perpendicular to the tape for cooperation with a slider.

8. An interlockable element for a slide fastener, said element comprising a head and spread jaws connected thereto, said head being formed with interlocking means, and said jaws being so widely spaced and spread and so shaped as to form a space therebetween large enough and so shaped that the material removed from between said jaws will itself constitute a head like the head of the element, said jaws having ends arranged substantially perpendicular to the outer sides of the jaws, said ends being of such dimension that when closed against a tape the sides of the jaws are brought into substantially parallel relation while the ends form substantially perpendicular shoulders for cooperation with a slider.

9. In the manufacture of slide fastener elements, the method which includes forming a continuous strip of metal having notched or serrated edges conforming to the outer ends of embryo spread jaws, said strip comprising a series of embryo elements with the embryo head of one formed within and filling the space within the embryo spread jaws of the next element, and severing the elements without substantial scrap or waste.

10. In the manufacture of slide fastener elements, the method which includes forming a continuous strip of metal to have notched or serrated edges conforming to the outer ends of embryo spread jaws, and a series of interlocking means, the successive notches being closely adjacent one another and the successive interlocking means being closely adjacent one another, the spacing therebetween being only a fraction of the length of the elements and corresponding to the spacing of a series of embryo elements with the embryo head of one embryo nested fully within the filling the space within the spread embryo jaws of the next embryo element, and severing the strip on an outline such as to define the elements without substantial scrap or waste.

11. In the manufacture of slide fastener elements, the method which includes treating a wire to give the same serrated or notched edges conforming to the outer ends of the embryo spread jaws of a series of embryo fastener elements, and severing individual fastener elements from the wire by means of a punch or other severing means which functions to outline the head of the element, the head of each element being formed between and filling the space between the embryo spread jaws of the next element, whereby the elements are formed without substantial scrap or waste.

12. In the manufacture of slide fastener elements, the method which includes pressing a round wire between forming devices to squeeze the same or deform the same into a wire having serrated or notched edges and a series of interlockable projections and recesses on opposite sides of the wire, the embryo head of each element being formed between and filling the space between the embryo spread jaws of the next element, and finally forming the individual elements by severing the endmost element from the embryo jaws of the next succeeding element, whereby said elements are formed without substantial scrap or waste.

13. In the manufacture of slide fastener elements, the method which includes pressing a round wire between forming devices to squeeze and deform the same into a wire having serrated or notched edges, and a series of interlockable projections and recesses on opposite sides of the wire, the successive serrations geing closely adjacent one another and the successive interlockable means being closely adjacent one another, the spacing therebetween being only a fraction of the length of the elements and corresponding to the spacing of a series of embryo fastener elements with the embryo head of each embryo element nested fully within and filling the space between the embryo spread jaws of the next embryo element, and finally forming the individual elements by severing the strip on an outline such as to define the elements without substantial scrap or waste.

14. In the manufacture of slide fastener elements, the method which includes rolling a continuous wire between appropriately shaped pressure rolls to squeeze and deform the wire so as to give the same serrated or notched edges conforming to the outer ends of the embryo spread jaws of a series of embryo fastener elements, and severing individual fastener elements from the wire by means of a punch or other severing means which functions to outline the head of the element, the embryo head of each element being formed between and substantially filling the space between the embryo spread jaws of the next element, whereby the elements are formed without substantial scrap or waste.

15. In the manufacture of slide fastener elements, the method which includes rolling a wire between appropriately recessed pressure rolls to squeeze the wire and deform the same into a wire having serrated or notched edges and a series of interlockable projections and recesses on opposite sides of the wire, the spacing of the serrations and of the interlockable means being so close as to correspond to a series of embryo fastener elements only if the embryo head of each embryo element is nested fully within and substantially fills the space between the embryo spread jaws of the next embryo element, and finally forming the individual elements by severing the strip on an outline such as to define the elements without substantial scrap or waste.

16. In the manufacture of slide fastener elements, the method which includes pressing a round wire between forming devices to squeeze the same or deform the same into a wire having serrated or notched edges and a series of interlockable projections and recesses on opposite sides of the wire, and a trough or scoring outlining the heads of the elements, the embryo head of each element being formed between and filling the space between the embryo spread jaws of the next element, and finally forming the individual elements by severing the elements at the scoring without substantial scrap or waste.

17. In the manufacture of slide fastener elements, the method which includes forming a continuous strip of metal having notched or serrated edges conforming to the outer ends of embryo spread jaws, said strip comprising a series of embryo elements with the embryo head of one formed within and filling the space within the embryo spread jaws of the next element, and successively severing the elements by separating the head of the endmost element from between the embryo jaws of the next succeeding element by punching the strip including said embryo jaws away from the endmost element, whereby said elements are formed without substantial scrap or waste.

18. In the manufacture of slide fastener elements, the method which includes cutting successive strips from a sheet of material, each of said strips having notched or serrated edges conforming to the outer ends of the spread jaws of successive fastener elements, the successive strips mating together with the serrated edge of one fitting into the serrated edge of the next, whereby said strips are cut from the sheet without substantial scrap or waste, and severing each strip into individual elements.

19. In the manufacture of slide fastener elements, the method which includes cutting successive strips from a sheet of material, each of said strips having notched or serrated edges conforming to the outer ends of the spread jaws of successive fastener elements, and severing the individual elements by means of a punch or cutting means which outlines the head of the element, said head conforming to and fitting within and substantially filling the space between the spread jaws of the next element, whereby the individual elements are formed from each of the serrated strips without substantial scrap or waste.

20. In the manufacture of slide fastener elements, the method which includes cutting successive strips from a sheet of material, each of said strips having notched or serrated edges conforming to the outer ends of the spread jaws of successive fastener elements, the successive strips mating together with the serrated edge of one fitting into the serrated edge of the next, whereby said strips are cut from the sheet without substantial scrap or waste, and severing the individual elements by means of a punch or cutting means which outlines the head of the element, said head conforming to and fitting within and substantially filling the space between the spread jaws of the next element, whereby the individual elements are formed from each of the serrated strips without substantial scrap or waste.

21. In the manufacture of slide fasteners, the method which includes forming a continuous strip of metal having notched or serrated edges conforming to the outer ends of embryo spread jaws, said strip comprising a series of embryo elements with the embryo head of one formed within and filling the space within the embryo spread jaws of the next element, feeding the strip longitudinally with the embryo elements pointing jaw first toward a transversely extending tape until the jaws at the end of the strip are astride the tape, thereupon punching the strip including the embryo jaws of the second element away from the endmost element in a direction parallel to the direction of the tape, clamping the jaws of the endmost element on the tape, feeding the tape in longitudinal direction, again feeding the strip to bring the next jaws astride the tape, and so on.

22. In the manufacture of slide fasteners, the method which includes forming a continuous strip of metal having successive closely adjacent projections on one side and having successive closely adjacent recesses on the opposite side, the spacing between the successive projections and the successive recesses being only a fraction of the length of the elements to be formed therefrom and corresponding to the spacing of a series of embryo fastener elements with the embryo head of each element nested fully within and filling the space between the embryo spread jaws of the next embryo element, feeding the strip longitudinally with the embryo elements pointing jaw first toward a transversely extending tape until the jaws at the end of the strip are astride the tape, thereupon punching the strip including the embryo jaws of the second element away from the endmost element in a direction parallel to the direction of the tape, clamping the jaws of the endmost element on the tape, feeding the tape in longitudinal direction, again feeding the strip to bring the next jaws astride the tape, and so on.

23. A step product used in the manufacture of slide fastener elements, said step product comprising a flattened strip of metal having closely spaced interlocking means at the top and bottom, the exterior edges of the strip having closely spaced notched or serrations to conform to the outer ends of embryo spread jaws, said spacing being only a fraction of the length of the elements, the strip providing metal for a series of embryo fastener elements with the embryo head of one embryo element nested within and filling the space between the embryo spread jaws of the next embryo element, whereby the elements may be formed from the strip without substantial waste or scrap material, the interlocking means comprising closely spaced projections at the top of the strip and closely spaced recesses at the bottom of the strip, the top of the strip having troughs or indentations bordering part of the periphery of the projections at the top of the strip.

FREDERICK ULRICH.

CERTIFICATE OF CORRECTION.

Patent No. 2,221,740. November 12, 1940.

FREDERICK ULRICH.

It is hereby certified that error appears in the printed specification of the above numbered patent requiring correction as follows: Page 4, first column, line 75, claim 10, after "embryo" second occurrence, insert --element--; and second column, line 1, same claim, for "the" first occurrence, read --and--; line 38, for "geing" read --being--; page 5, second column, line 54, for "notched" read --notches--; and that the said Letters Patent should be read with this correction therein that the same may conform to the record of the case in the Patent Office.

Signed and sealed this 31st day of December, A. D. 1940.

(Seal)

Henry Van Arsdale,
Acting Commissioner of Patents.